United States Patent
Badie et al.

(10) Patent No.: US 9,337,648 B2
(45) Date of Patent: May 10, 2016

(54) DEVICE, METHOD, AND SYSTEM FOR INTEGRATED BATTERY POWER CONTROL

(71) Applicant: THALES DEFENSE & SECURITY, INC., Clarksburg, MD (US)

(72) Inventors: Mehrdad Badie, Gaithersburg, MD (US); Dennis Crossen, Clarksburg, MD (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 442 days.

(21) Appl. No.: 13/963,314

(22) Filed: Aug. 9, 2013

(65) Prior Publication Data

US 2014/0042829 A1 Feb. 13, 2014

Related U.S. Application Data

(60) Provisional application No. 61/682,512, filed on Aug. 13, 2012.

(51) Int. Cl.
*H02H 7/18* (2006.01)
*H02J 7/00* (2006.01)
*H01H 83/00* (2006.01)
*H02H 3/00* (2006.01)

(52) U.S. Cl.
CPC .. *H02H 7/18* (2013.01); *H02J 7/00* (2013.01); *H02J 7/0031* (2013.01); *H02J 7/0063* (2013.01); *Y10T 307/858* (2015.04)

(58) Field of Classification Search
CPC ............ H02H 7/18; H02J 7/00; H02J 7/0031; H02J 7/0063; Y10T 307/858
USPC ....................................................... 307/130
See application file for complete search history.

(56) References Cited

U.S. PATENT DOCUMENTS 8,369,056 B2 * 2/2013 Senriuchi ............... H02H 3/066
361/93.1
8,675,326 B2 * 3/2014 Shono ................... H01M 10/48
307/127

* cited by examiner

*Primary Examiner* — Hal Kaplan
(74) *Attorney, Agent, or Firm* — Arent Fox LLP

(57) ABSTRACT

A device, method, and system includes an integrated battery power controller configured to monitor a voltage difference between a first output terminal and a second output terminal; disconnect, via a switch, at least one of the first output terminal and the second output terminal from a power source if the voltage difference between the first output terminal and the second output terminal is less than a predetermined voltage threshold; and connect, via the switch, both the first output terminal and the second output terminal to the power source if the voltage difference between the first output terminal and the second output terminal is equal to or greater than the predetermined voltage threshold.

10 Claims, 4 Drawing Sheets

DEVICE, METHOD, AND SYSTEM FOR INTEGRATED BATTERY POWER CONTROL

CLAIM OF PRIORITY UNDER 35 U.S.C. §119

This application claims the benefit of and priority to U.S. Provisional Patent Application No. 61/682,512, titled "Device, Method, and System for Integrated Battery Power Control," filed Aug. 13, 2012, the disclosure of which is hereby incorporated in its entirety by reference herein.

BACKGROUND

1. Field

Aspects of the present invention generally relate to a control system for a battery, and more particularly to a device, method, and system for integrated battery power control.

2. Introduction

Military tactical handheld batteries are typically required to meet various specifications, such as an ability to withstand meter-deep immersion under water. Generally, the contacts of a battery while connected to an electrical equipment may be protected and sealed against water ingress. However, a standalone battery is not protected against corrosion if exposed to water. A battery may be exposed to water during a deep dive or if left exposed to rain or salt water. Typically, soldiers carry just enough batteries to last the length of their mission (e.g., 48 hours). If batteries are damaged due to exposure to water during a mission, equipment that is dependent on battery power, such as radio equipment, may become inoperable and jeopardize the mission.

Some solutions to avoid such scenarios include the use of an external attachment (e.g., a protective cap) that is connected to the battery to protect the battery discharge contacts, or simply the use of a water sealed plastic bag during a deep dive. These solutions, however, are external to the battery and do not guarantee protection against exposure to water, because a protective cap and a sealed bag may be damaged and expose the battery to water, for example. Moreover, if none of these external solutions are present, corrosion of the battery during a deep dive is inevitable.

Therefore, there exists an unmet need in the art for a device, method, and system for integrated battery power control that protects the battery in the event of exposure to water.

SUMMARY

According to an aspect of the present invention, a method for integrated battery power control, may include monitoring a voltage difference between a first output terminal and a second output terminal, disconnecting at least one of the first output terminal and the second output terminal from a power source if the voltage difference between the first output terminal and the second output terminal is less than a predetermined voltage threshold, and providing coupling of both the first output terminal and the second output terminal to the power source if the voltage difference between the first output terminal and the second output terminal is equal to or greater than the predetermined voltage threshold.

According to another aspect of the present invention, an apparatus may include a power source, a first output terminal, a second output terminal, a switch coupled to the first output terminal and the second output terminal, a switch controller coupled to the switch, the switch including one or more hardware, operational logic, or software features configured to: monitor a voltage difference between the first output terminal and the second output terminal; disconnect, via the switch, at least one of the first output terminal and the second output terminal from the power source if the voltage difference between the first output terminal and the second output terminal is less than a predetermined voltage threshold; and connect, via the switch, both the first output terminal and the second output terminal to the power source if the voltage difference between the first output terminal and the second output terminal is equal to or greater than the predetermined voltage threshold.

According to yet another aspect of the present invention, a battery power saving device may include a first output terminal, a second output terminal, a switch coupled to the first output terminal and the second output terminal, a switch controller coupled to the switch, the switch controller including: a monitoring component for monitoring a voltage difference between the first output terminal and the second output terminal; a coupling disconnect component shown as 114a of FIG. 1 for disabling power delivery, via the switch, to at least one of the first output terminal and the second output terminal, the power delivery being communicated from a power source if the voltage difference between the first output terminal and the second output terminal is less than a predetermined voltage threshold; and a coupling connect component shown as 144a of FIG. 1 for enabling power delivery, via the switch, to both the first output terminal and the second output terminal from the power source if the voltage difference between the first output terminal and the second output terminal is equal to or greater than the predetermined voltage threshold.

According to yet another aspect of the present invention, a system may include means for monitoring a voltage difference between a first output terminal and a second output terminal, means for disconnecting at least one of the first output terminal and the second output terminal from a power source if the voltage difference between the first output terminal and the second output terminal is less than a predetermined voltage threshold, and means for connecting both the first output terminal and the second output terminal to the power source if the voltage difference between the first output terminal and the second output terminal is equal to or greater than the predetermined voltage threshold.

According to yet another aspect of the present invention, a computer program product including a non-transitory computer-readable medium having control logic stored therein for causing a computer to control a battery power output, the control logic may include code for monitoring a voltage difference between a first output terminal and a second output terminal, code for disconnecting at least one of the first output terminal and the second output terminal from a power source if the voltage difference between the first output terminal and the second output terminal is less than a predetermined voltage threshold, and code for connecting both the first output terminal and the second output terminal to the power source if the voltage difference between the first output terminal and the second output terminal is equal to or greater than the predetermined voltage threshold.

According to yet another aspect of the present invention, a method for integrated battery power control may include monitoring a voltage difference across a sense resistor that is connected between a power source and one of a first output terminal and a second output terminal, disconnecting at least one of the first output terminal and the second output terminal from the power source if the voltage difference across the sense resistor is less than a predetermined voltage threshold, and providing coupling of both the first output terminal and the second output terminal to the power source if the voltage difference across the sense resistor is equal to or greater than the predetermined voltage threshold.

It is understood that other aspects of the invention will become readily apparent to those skilled in the art from the following detailed description, wherein various aspects of the present invention are shown and described by way of illustration only. As will be understood, the present invention is capable of other and different variations and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

These and other sample aspects of the disclosure will be described in the detailed description and the appended claims that follow, and in the accompanying drawings, wherein:

Figure 1:
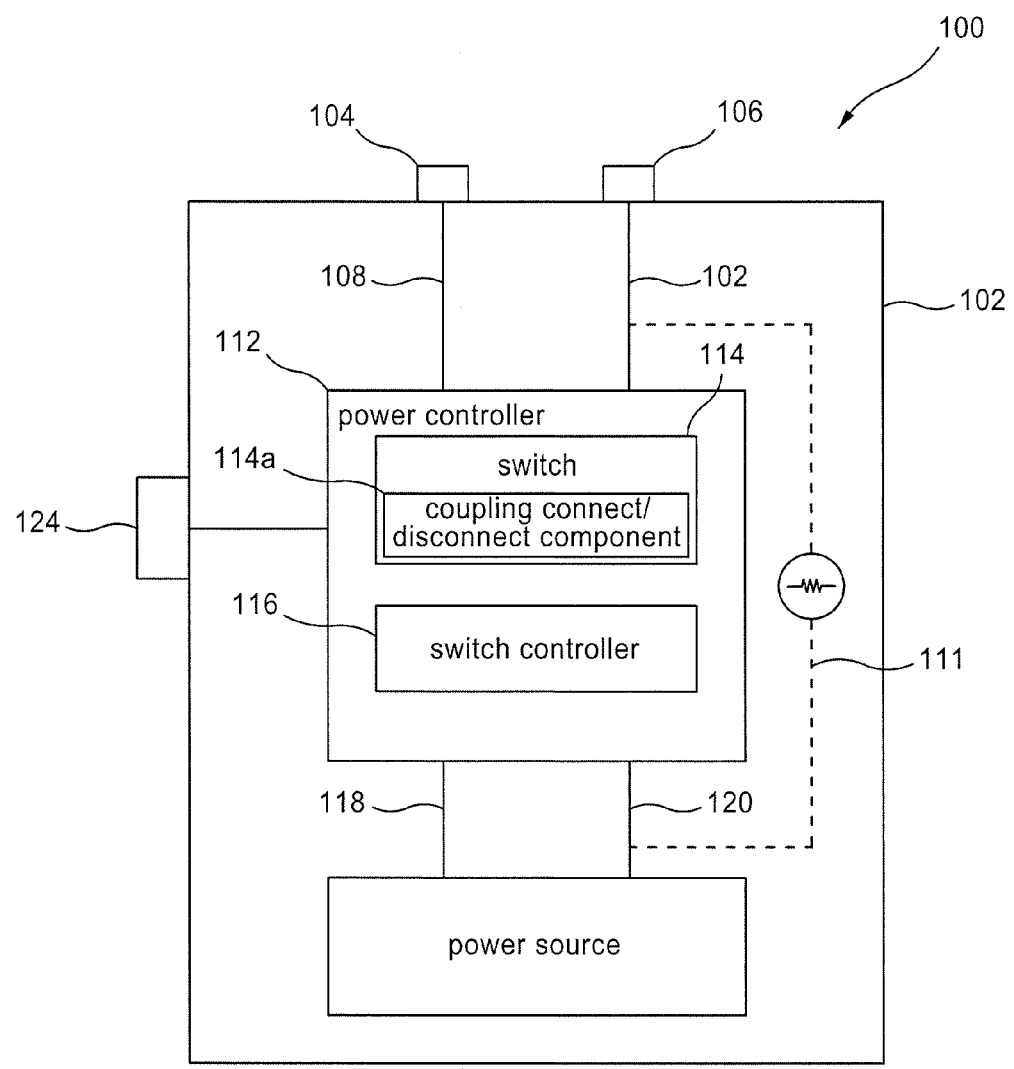
FIG. 1 is an example representative diagram illustrating a simplified system for integrated battery power control in accordance with aspects of the present invention.

In accordance with common practice, the various features illustrated in the drawings may be simplified for clarity. Thus, the drawings may not depict all of the components of a given apparatus or method. In addition, like reference numerals may be used to denote like features throughout the specification and figures.

DETAILED DESCRIPTION

Various aspects of the present invention are described below. It should be apparent that the teachings herein may be embodied in a wide variety of forms and that any specific structure, function, or both being disclosed herein may be merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality, in addition to or other than one or more of the aspects set forth herein. An aspect may comprise one or more elements of a claim.

Various aspects of the present invention solve the above-identified needs, as well as others, via devices, methods, and systems capable of providing integrated battery power control.

FIG. 1 is an example representative diagram illustrating a system 100 for integrated battery power control in accordance with aspects of the present invention. The system 100 may include a battery chassis 102 that may house a power controller 112 and a power source 122. The battery chassis 102 may also include output pins 104 and 106 (e.g., battery terminals) for connecting to and powering an electronic device (not shown). The output pin 104 may be coupled to the power source 122 via lead or other coupling 108, and, therethrough, for example, to the power controller 112, via lead or other coupling 118. Similarly, the output pin 106 may be coupled to the power source 122 via lead or other coupling 110, and, therethrough, for example, to the power controller 112, via lead or other coupling 120.

The power controller 112 may include a switch 114 and a switch controller that includes one or more processing devices, monitoring component, signaling or control components capable of operably communicating with the switch 114 and other power controller features, and/or other similarly operating features 116 that provide monitoring and control of an electrical connection between the output pins 104, 106 and the power source 122. The chassis 102 may also include a toggle 124 that may be coupled to the power controller 112 and that may provide manual operation of the power controller 112.

The power controller 112 prevents corrosion of the output pins 104 and 106 without the use of any external cover or sealed enclosure by automatically disconnecting the power source 122 from the output pins 104, 106 when there is no load on the power source 122. This may be accomplished by measuring a voltage differential across a sense resistor and comparing the measured voltage differential to a predetermined voltage differential and/or by measuring a current flow or a voltage difference between the output pins 104 and 106 and comparing the measured current flow or voltage difference with a predetermined current threshold or voltage threshold, respectively.

For example, in accordance with an aspect of the present invention, the switch controller 116 (e.g., such switch controller including a processor or processing system, a computer or computer system, and/or other logic features and/or components coupled to suitable hardware or other features for providing monitoring, control, and/or other operational functions) may monitor a current flow between the output pins 104 and 106 and/or a voltage difference between the output pins 104 and 106. If features of the switch controller 116 detect any current flow or a voltage difference between the output pins 104 and 106 that is below a predetermined current or voltage threshold, then the switch controller 116 may trigger the switch 114 to disconnect either or both of the output pins 104, 106 from the power source by disconnecting lead or other coupling 108 from lead or other coupling 118 and/or disconnecting lead or other coupling 110 from lead or other coupling 120. Disconnecting one or both of the output pins 104 and 106 from the power source will prevent any undesirable electrical discharge from the output pins 104 and 106, thus preventing or reducing corrosion of the output pins 104, 106.

In accordance with another aspect of the present invention, the power controller 112 may include a sense resistor 111 that may be connected in series between the power source 122 and one of the output pins 104, 106. For example, the sense resistor may be connected between the power source 122 and the output pin 104 or between the power source 122 and the output pin 106. Alternatively, the system 100 may have two sense resistors—a first sense resistor connected between the power source 122 and the output pin 104, and a second sense resistor connected between the power source 122 and the output pin 106. The switch controller 116 may measure a voltage differential across the sense resistor. If the voltage differential across the sense resistor is below a predetermined voltage differential (where the predetermined voltage differential may be associated with an active use of the power source 122 by a connected electronic device), then the switch controller 116 may trigger the switch 114 to disconnect either or both or the output pins 104, 106 from the power source 122.

In accordance with aspects of the present invention, the system 100 may use the sense resistor to determine whether to disconnect the output pins 104, 106 from the power source 122 either alternatively or in conjunction with using current flow or voltage difference measurements between the output pins 104 and 106 to determine whether to disconnect the output pins 104, 106 from the power source 122.

When the system 100 is connected to an electronic device, the switch controller 116 may detect the connection (e.g., via detecting a voltage differential across the sense resistor to be at or above a predetermined voltage differential and/or via detecting current flow or voltage difference to be at or above a predetermined current or voltage threshold) between the output pins 104, 106 and the electronic device, and thereby enabling, maintaining, or triggering the switch 114 to couple the output pins 104, 106 to the power source 122 by coupling lead or other coupling 108 to lead or other coupling 118 and coupling lead or other coupling 110 to lead or other coupling 120.

In accordance with another aspect of the present invention, a user may use the toggle 124 to manually trigger the switch 114 to connect/disconnect the output pins 104,106 to/from the power source 122.

Figure 2:
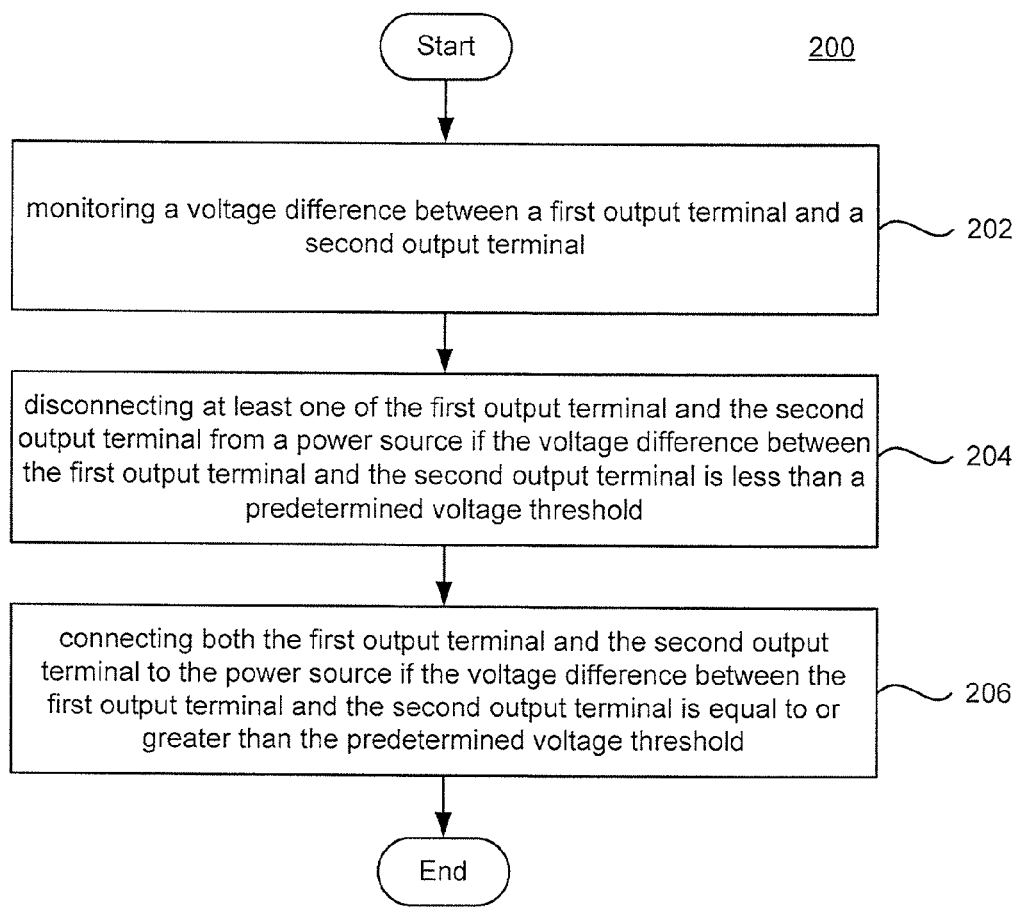
FIG. 2 illustrates an example flow diagram of a method for integrated battery power control in accordance with aspects of this invention.

FIG. 2 illustrates an example flow diagram of a method 200 for integrated battery power control in accordance with aspects of this invention. As shown in FIG. 2, the process may begin in block 202, where a voltage difference may be monitored between a first output terminal and a second output terminal. For example, the switch controller 116 may monitor a voltage difference between output pins 104 and 106.

In block 204, at least one of the first output terminal and the second output terminal may be disconnected from a power source if the voltage difference between the first output terminal and the second output terminal is less than a predetermined voltage threshold (or, for example, current flow between the first and second output terminals is below a predetermined current threshold). For example, the switch controller 116 may trigger the switch 114 to disconnect at least one of the output pins 104 and 106 from the power source 122.

In block 206, at least one of the first output terminal and the second output terminal may be connected to a power source (e.g., connection/coupling enabled, maintained, or triggered into connecting/coupling operation) if the voltage difference between the first output terminal and the second output terminal is equal to or greater than the predetermined voltage threshold. For example, the switch controller 116 may trigger the switch 114 to connect the output pins 104 and 106 to the power source 122.

Figure 3:
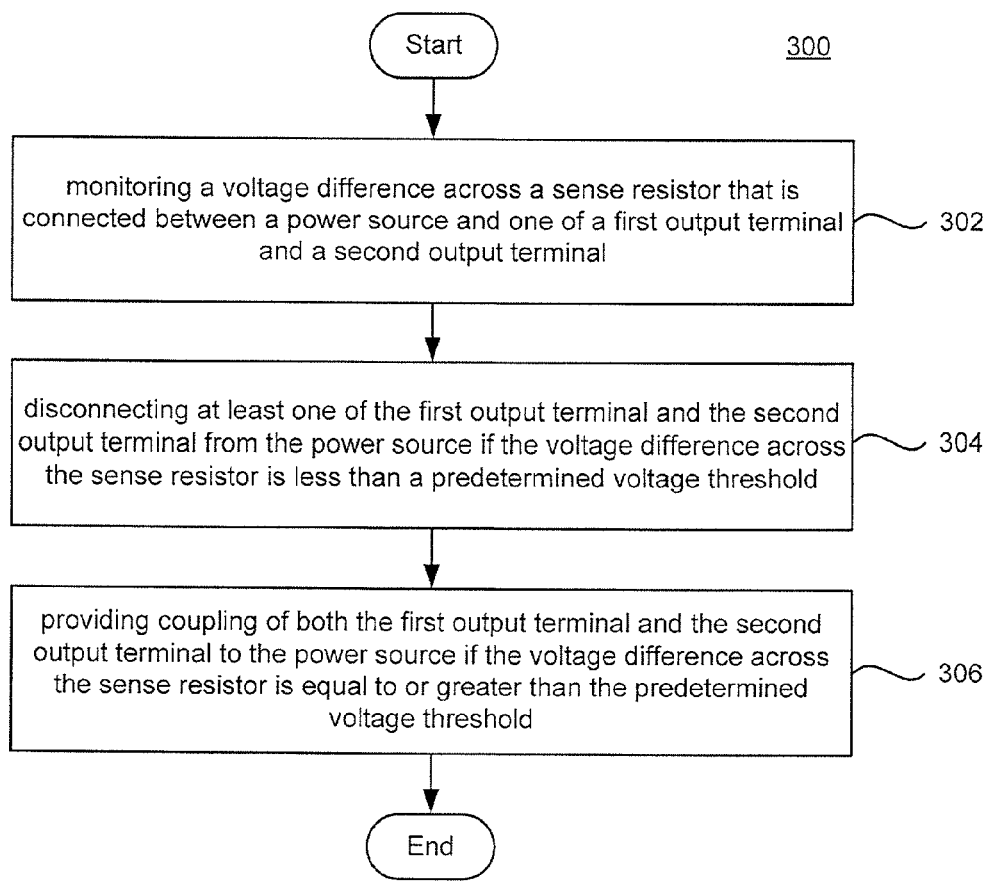
FIG. 3 illustrates an example flow diagram of a method for integrated battery power control in accordance with aspects of this invention.

FIG. 3 illustrates an example flow diagram of a method 300 for integrated battery power control in accordance with aspects of this invention. As shown in FIG. 3, the process may begin in block 302, where a voltage difference may be monitored across a sense resistor that is connected between a power source and one of a first output terminal and a second output terminal. For example, the switch controller 116 may monitor a voltage difference across the sense resistor that is connected between the power source 122 and one of output pins 104 and 106.

In block 304, at least one of the first output terminal and the second output terminal may be disconnected from the power source if the voltage difference across the sense resistor is less than a predetermined voltage threshold. For example, the switch controller 116 may trigger the switch 114 to disconnect at least one of the output pins 104 and 106 from the power source 122.

In block 306, at least one of the first output terminal and the second output terminal may be connected to a power source (e.g., connection/coupling enabled, maintained, or triggered into connecting/coupling operation) if the voltage difference across the sense resistor is equal to or greater than the predetermined voltage threshold. For example, the switch controller 116 may trigger the switch 114 to connect the output pins 104 and 106 to the power source 122.

Figure 4:
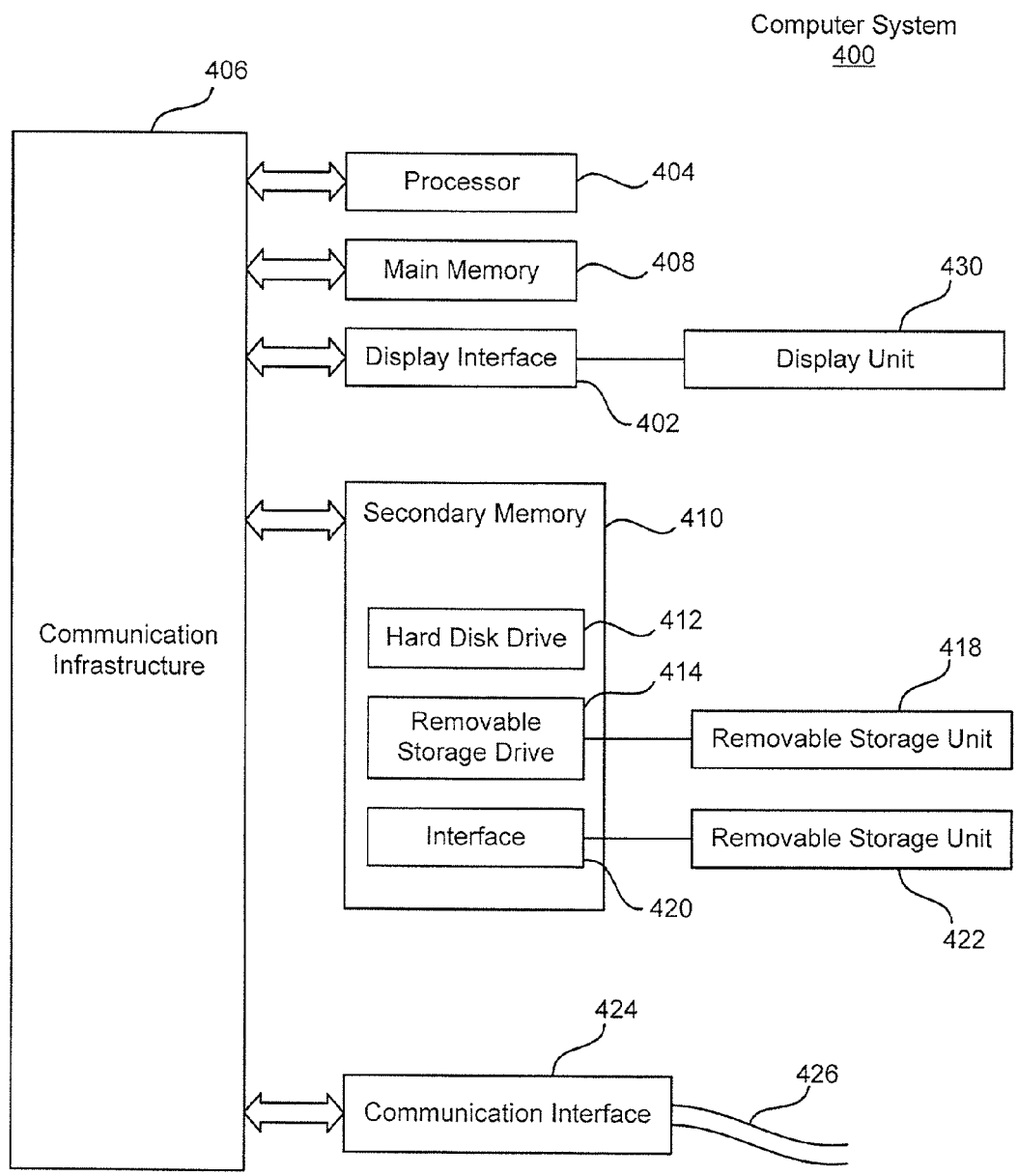
FIG. 4 depicts a computer system for implementing various aspects of the present invention.

Aspects of the present invention may be implemented using hardware, software, or a combination thereof and may be implemented in one or more computer systems or other processing systems. In one variation, aspects of the invention are directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, a cross-over bar, or a network). Various software aspects are described in terms of this exemplary computer system. After reading this description, it will become apparent to a person skilled in the relevant art(s) how to implement aspects of the invention using other computer systems and/or architectures.

Computer system 400 can include a display interface 402 that forwards graphics, text, and other data from the communication infrastructure 406 (or from a frame buffer not shown) for display on a display unit 430. Computer system 400 also includes a main memory 408, such as random-access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418 represents a floppy disk, a magnetic tape, a thumb drive, an optical disk, etc., which is read by and written to removable storage drive 414. As will be appreciated, the removable storage unit 418 includes a computer usable storage medium having stored therein computer software and/or data.

In alternative variations, secondary memory 410 may include other similar devices for allowing computer programs or other instructions to be loaded into computer system 400. Such devices may include, for example, a removable storage unit 422 and an interface 420. Examples of such may include a program cartridge and a cartridge interface (such as that found in video game devices), a removable memory chip (such as an erasable programmable read-only memory (EPROM) or a programmable read-only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals, which may be electronic, electromagnetic, optical, or other signals capable of being received by communications interface 424. These signals are provided to communications interface 424 via a communications path (e.g., channel) 426. This path 426 carries signals and may be implemented using wire or cable, fiber optics, a telephone line, a cellular link, a radio frequency (RF) link, and/or other communications channels. In this document, the terms "computer program medium," "computer-usable medium," and "computer-readable medium" are used to refer generally to media such as a removable storage drive 414, a hard disk installed in hard disk drive 412, and signals. These computer program products provide software to the computer system 400. Aspects of the invention are directed to such computer program products.

Computer programs (also referred to as computer control logics) are stored in main memory 408 and/or secondary memory 410. Computer programs may also be received via communications interface 424. Such computer programs, when executed, enable the computer system 400 to perform the features in accordance with aspects of the present invention, as discussed herein. In particular, the computer programs, when executed, enable the processor 404 to perform such features. Accordingly, such computer programs represent controllers of the computer system 400.

In a variation where aspects of the invention are implemented using software, the software may be stored in a computer program product and loaded into computer system 400 using removable storage drive 414, hard disk drive 412, or communications interface 420. The control logic (software), when executed by the processor 404, causes the processor 404 to perform the functions as described herein. In another variation, aspects of the invention are implemented primarily in hardware using, for example, hardware components, such as application-specific integrated circuits (ASIC's). Implementation of the hardware state machine so as to perform the functions described herein will be apparent to persons skilled in the relevant art(s).

In yet another variation, aspects of the invention are implemented using a combination of both hardware and software.

While aspects of the present invention have been described in connection with preferred implementations, it will be understood by those skilled in the art that variations and modifications described above may be made without departing from the scope hereof. Other aspects will be apparent to those skilled in the art from a consideration of the specification or from a practice of the aspects of the invention disclosed herein.

What is claimed is:

1. A method for integrated battery power control, comprising:
   monitoring a voltage difference between a first output terminal and a second output terminal;
   disconnecting at least one of the first output terminal and the second output terminal from a power source if the voltage difference between the first output terminal and the second output terminal is less than a predetermined voltage threshold; and
   providing coupling of both the first output terminal and the second output terminal to the power source if the voltage difference between the first output terminal and the second output terminal is equal to or greater than the predetermined voltage threshold.

2. The method of claim 1, further comprising:
   receiving a manual input to connect the first output terminal and the second output terminal to the power source; and
   coupling the first output terminal and the second output terminal to the power source based on the manual input.

3. The method of claim 1, further comprising:
   receiving a manual input to disconnect the first output terminal and the second output terminal from the power source; and
   decoupling the first output terminal and the second output terminal from the power source based on the manual input.

4. An apparatus, comprising:
   a power source;
   a first output terminal;
   a second output terminal;
   a switch coupled to the first output terminal and the second output terminal;
   a switch controller coupled to the switch, the switch including one or more hardware, operational logic, or software features configured to:
      monitor a voltage difference between the first output terminal and the second output terminal;
      disconnect, via the switch, at least one of the first output terminal and the second output terminal from the power source if the voltage difference between the first output terminal and the second output terminal is less than a predetermined voltage threshold; and
      connect, via the switch, both the first output terminal and the second output terminal to the power source if the voltage difference between the first output terminal and the second output terminal is equal to or greater than the predetermined voltage threshold.

5. A battery power saving device, comprising:
   a first output terminal;
   a second output terminal;
   a switch coupled to the first output terminal and the second output terminal;
   a switch controller coupled to the switch, the switch controller including:
      a monitoring component for monitoring a voltage difference between the first output terminal and the second output terminal;
      a coupling disconnect component for disabling power delivery, via the switch, to at least one of the first output terminal and the second output terminal, the power delivery being communicated from a power source if the voltage difference between the first output terminal and the second output terminal is less than a predetermined voltage threshold; and
      a coupling connect component for enabling power delivery, via the switch, to both the first output terminal and the second output terminal from the power source if the voltage difference between the first output terminal and the second output terminal is equal to or greater than the predetermined voltage threshold.

6. A system, comprising:
   means for monitoring a voltage difference between a first output terminal and a second output terminal;
   means for disconnecting at least one of the first output terminal and the second output terminal from a power source if the voltage difference between the first output terminal and the second output terminal is less than a predetermined voltage threshold; and
   means for connecting both the first output terminal and the second output terminal to the power source if the voltage difference between the first output terminal and the second output terminal is equal to or greater than the predetermined voltage threshold.

7. The system of claim 6, further comprising:
   means for receiving a manual input to connect the first output terminal and the second output terminal to the power source; and means for coupling the first output terminal and the second output terminal to the power source based on the manual input.

8. The system of claim 6, further comprising:

means for receiving a manual input to disconnect the first output terminal and the second output terminal from the power source; and means for decoupling the first output terminal and the second output terminal from the power source based on the manual input.

9. A computer program product comprising a non-transitory computer-readable medium having control logic stored therein for causing a computer to control a battery power output, the control logic comprising:

code for monitoring a voltage difference between a first output terminal and a second output terminal;

code for disconnecting at least one of the first output terminal and the second output terminal from a power source if the voltage difference between the first output terminal and the second output terminal is less than a predetermined voltage threshold; and code for connecting both the first output terminal and the second output terminal to the power source if the voltage difference between the first output terminal and the second output terminal is equal to or greater than the predetermined voltage threshold.

10. A method for integrated battery power control, comprising:

monitoring a voltage difference across a sense resistor that is connected between a power source and one of a first output terminal and a second output terminal;

disconnecting at least one of the first output terminal and the second output terminal from the power source if the voltage difference across the sense resistor is less than a predetermined voltage threshold; and providing coupling of both the first output terminal and the second output terminal to the power source if the voltage difference across the sense resistor is equal to or greater than the predetermined voltage threshold.

* * * * *